United States Patent [19]
Hardin

[11] 3,769,051
[45] Oct. 30, 1973

[54] SET RETARDER AND AIR-ENTRAINER COMPOSITION FOR MORTAR

[76] Inventor: George E. Hardin, Bloomington, Ind.

[22] Filed: June 15, 1972

[21] Appl. No.: 263,293

Related U.S. Application Data

[63] Continuation-in-part of Ser. No. 817,183, April 17, 1969, abandoned.

[52] U.S. Cl.................... 106/90, 106/95, 106/97, 106/315
[51] Int. Cl................................................ C04b 7/02
[58] Field of Search...................... 106/314, 315, 90, 106/95, 97

[56] References Cited
UNITED STATES PATENTS

| | | | |
|---|---|---|---|
| 3,307,588 | 3/1967 | Hylak..................................... | 106/90 |
| 3,317,327 | 5/1967 | Matsuda et al. ...................... | 106/90 |

*Primary Examiner*—Delbert E. Gantz
*Assistant Examiner*—James W. Hellwege
*Attorney*—Harvey B. Jacobson

[57] ABSTRACT

A mortar set retarder and air-entrainer composition comprising an aqueous solution of sodium tripolyphosphate, a water-soluble ethylene oxide condensation product and a wetting agent. The retarder may optionally include a polyamino polycarboxylic acid.

5 Claims, No Drawings

SET RETARDER AND AIR-ENTRAINER COMPOSITION FOR MORTAR

This application is a continuation-in-part of my earlier co-pending application Ser. No. 817,183, filed Apr. 17, 1969, now abandoned.

This invention relates to a composition of matter which is admixed with mortar or plaster and to the use of the composition to retard the setting and increase the workability of mortar. More particularly, the present invention relates to the use of an aqueous solution of sodium tripolyphosphate and surfactants, and optionally ethylenediamine-tetraacetic acid (EDTA), as an additive for mortar, i.e., Portland cement, Gypsum plaster, etc., to improve the workability of such compositions.

In spite of the fact that numerous mortar additives have been proposed heretofore, a need still exists for a universal type mortar additive that functions as a mortar set retarder, air-entrainer, plasticizer, and waterproofing composition.

The aforestated need is satisfied by the utilization of the compositions of the present invention which are set forth in greater detail hereinafter.

In one exemplary formulation a liquid additive for mortar in accordance with the present invention consists of an aqueous solution containing approximately 2 percent sodium tripolyphosphate, approximately 1 percent of a water-soluble ethylene oxide condensation product, approximately 40 percent of a wetting agent consisting of a sodium salt of an alkyl sulfonate, and 57 percent water.

The aforestated composition is added to the water utilized to hydrate a mortar at the rate of approximately 5 liquid ounces to 12 liquid ounces per 5 gallons of water.

In another exemplary formulation the liquid additive consists of an aqueous solution containing approximately 24 percent sodium dodecylbenzene sulfonate, 3 percent iso-octyl phenoxy polyethoxy ethanol, 2.5 percent sodium xylene sulfonate, 1.0 percent EDTA and 60.5 percent water.

The water-soluble ethylene oxide condensation product is preferably one obtained by condensing a number of mols of ethylene oxide with an aliphatic organic compound such as a fatty acid, alcohol, amine, etc. Particularly advantageous for use in the additive composition of the invention are materials formed by the condensation of a coco fatty acid, with an alkyl chain containing between about 6 and 18 carbon atoms. The number of mols of the ethylene oxide may be varied depending upon the particular organic compound condensed therewith and may for example comprise about 5 to 15 mols. Condensation products having low proportions of ethylene oxide and relatively low water solubility may be used so long as the solubility is sufficient to permit dissolution in the mixing water of the mortar of a small amount of the condensation product utilized. Exemplary of a suitable ethylene oxide condensation product is water soluble iso-octyl phenoxy polyethoxy ethanol, which is a biodegradable, liquid anhydrous, nonionic surface active agent commercially available from Rohm & Haas Company under the trademark Triton X-100.

The following examples are included to more specifically set forth exemplary mortar additive compositions produced in accordance with the present invention and exemplary modes of utilizing the same.

EXAMPLE I

| | By weight |
|---|---|
| Water | 57% |
| Sodium tripolyphosphate | 2% |
| Iso-octyl phenoxy polyethoxy ethanol | 1% |
| Sodium dodecylbenzene sulfonate | 40% |

The compositions were each added to separate batches of Portland cement mortar at the rate of 5-7 oz. per 5 gallons of water of hydration and wherein the ratio of cement to aggregate was approximately 1:2 by weight, and the water-cement ratio was approximately 1:2 by weight, which as will be appreciated is approximately 15 percent less water than normally utilized in hydrating Portland cement.

EXAMPLE II

| | By weight |
|---|---|
| Water | 69.5% |
| Sodium dodecylbenzene sulfonate | 24.0% |
| Iso-octyl phenoxy polyethoxy ethanol | 3.0% |
| Sodium xylene sulfonate | 2.5% |
| EDTA | 1.0% |

EXAMPLE III

A masonry mortar consisting of:

| | |
|---|---|
| Portland cement | 1 part by volume |
| Lime | 1.25 parts by volume |
| Masons sand | 6 parts by volume |
| Water | (73.8 by weight of cement and lime) |
| Composition of Example II | 3 liq. oz. / each 5 gal. of water | was admixed and test data relative thereto compiled as set forth below in Table I.

EXAMPLE IV

| | |
|---|---|
| Portland cement | 1 part by volume |
| Lime | 1.25 parts by volume |
| Masons sand | 6 parts by volume |
| Water | (77.9% by weight of cement and lime) |
| Composition of Example II | 3 liq. oz. / each 5 gal. of water |

TABLE I

| | Mortar of Example IV | | | Mortar of Example III | | |
|---|---|---|---|---|---|---|
| Wet density, 1 lbs./cu. ft. | 126.8 | | | 101.4 | | |
| Dry density, lbs./cu. ft. | 120.8 | | | 95.4 | | |
| Absorption, percent | 12.5 | | | 10.2 | | |
| Weight after 28 days, average grams | 256.3 | | | 200.5 | | |
| Compressive strength: | | | | | | |
| Pounds actual | 7,200 | 7,000 | 7,500 | 1,900 | 1,780 | 1,850 |
| Lbs./sq. inch | 1,800 | 1,750 | 1,875 | 475 | 445 | 462 |
| Tensile strength: | | | | | | |
| Pounds actual | 320 | 325 | 315 | 200 | 195 | 190 |
| Lbs./sq. inch | 320 | 325 | 315 | 200 | 195 | 190 |

EXAMPLE V

A cementitious composition suitable for forming structural block was admixed as follows:

360 lbs. cement
1000 lbs. pea gravel
3000 lbs. sand
9½ gal. water
24 liq. oz. composition of Example II The composition was utilized to mold 8 × 8 × 16 inches (2 cell) line blocks and test data relating thereto is set forth in Table II.

TABLE II

| Sample | Compression test | | | | | |
|---|---|---|---|---|---|---|
| | 1 | 2 | 3 | 4 | 5 | Average |
| Shell thick (in.): | | | | | | |
| Length (in.) | 15.62 | 15.62 | 15.62 | 15.62 | 15.62 | |
| Width (in.) | 7.62 | 7.62 | 7.62 | 7.62 | 7.62 | |
| Height (in.) | 7.62 | 7.62 | 7.62 | 7.62 | 7.62 | |
| Gross area (sq. in.) | 119.02 | 119.02 | 119.02 | 119.02 | 119.02 | |
| Total crushing load (lbs.) | 249,000 | 277,000 | 254,000 | 307,000 | 249,000 | |
| Compressive strength (gross sq. in.) | 2,090 | 2,280 | 2,130 | 2,580 | 2,090 | 2,235 |
| | Absorption test | | | | | |
| Weight, as received (lb.): | | | | | | |
| Dry weight (lbs.) | 43.20 | 43.20 | 43.10 | 43.30 | 43.10 | |
| Wet weight (lbs.) | 45.20 | 45.30 | 45.20 | 45.40 | 45.50 | |
| Suspended, immersed weight (lbs.) | 25.70 | 25.70 | 25.80 | 26.10 | 26.00 | |
| Weight (cu. ft.) (lbs.) | 138.24 | 137.53 | 138.63 | 140.00 | 137.60 | 138.40 |
| Absorption (percent) | 4.6 | 4.9 | 4.9 | 4.9 | 5.7 | 5.0 |
| Absorption (lbs./cu. ft.) | 6.40 | 6.69 | 6.75 | 6.79 | 7.67 | 6.86 |

EXAMPLE VI

Another cementitious composition suitable for forming structural block was admixed as follows:

360 lbs. cement
4500 lbs. sand and gravel
24 liq. oz. composition of Example II
11 gal. water
112 block yield The composition was utilized to mold 8 × 8 × 16 inches (cell) line blocks and was sufficient to mold 112 such blocks, i.e., the block yield was 112. Test data relating to the blocks is set forth in Table III.

TABLE III

| Sample | Compression test | | | | | |
|---|---|---|---|---|---|---|
| | 1 | 2 | 3 | 4 | 5 | Average |
| Shell thick (in.): | | | | | | |
| Length (in.) | 15.62 | 15.62 | 15.62 | 15.62 | 15.62 | |
| Width (in.) | 7.62 | 7.62 | 7.62 | 7.62 | 7.62 | |
| Height (in.) | 7.62 | 7.62 | 7.62 | 7.62 | 7.62 | |
| Gross area (sq. in.) | 119.02 | 119.02 | 119.02 | 119.02 | 119.02 | |
| Total crushing load (lbs.) | 199,000 | 196,000 | 212,000 | 208,000 | 184,000 | |
| Compressive strength (gross sq. in.) | 1,675 | 1,645 | 1,780 | 1,745 | 1,550 | 1,680 |
| | Absorption test | | | | | |
| Weight, as received (lb.): | | | | | | |
| Dry weight (lbs.) | 42.90 | 42.70 | 42.70 | 42.70 | 42.50 | |
| Wet weight (lbs.) | 45.10 | 44.90 | 44.80 | 44.90 | 44.90 | |
| Suspended, immersed weight (lbs.) | 25.30 | 25.30 | 25.30 | 25.20 | 25.10 | |
| Weight/cu. ft. (lbs.) | 135.20 | 135.94 | 136.64 | 135.25 | 133.94 | 135.39 |
| Absorption (percent) | 5.1 | 5.6 | 4.9 | 5.2 | 5.6 | 5.3 |
| Absorption (lbs./cu. ft.) | 6.93 | 7.0 | 6.72 | 6.97 | 7.56 | 7.04 |

The incorporation of the additive composition in the mortar has been found to retard the setting thereof while eliminating "mud-watering." In addition, the additive has been found to be highly suitable for utilization in lightweight insulating type concrete inasmuch as such concrete with the additive utilized therein has been found to undergo an approximately 15 percent increase in volume over the same concrete admixture without the additive. Furthermore, due to the plasticizing effect of the composition an approximately 20 percent increase in the workability of the concrete was observed and as a result thereof such operations as tuck pointing of masonry structures has been rendered substantially easier.

Still further, the utilization of the inventive compositions with Gypsum cements, also in the order of 3 liquid ounces to 12 liquid ounces per 5 gallons of water utilized in hydrating the Gypsum cement, has been found to prevent trowel burns, minimize cracking, peeling and chalking of the plaster.

While the present invention has been described with respect to particular embodiments thereof, it will be appreciated that numerous modifications may be made by those skilled in the art without actually departing from the scope of the invention.

What is claimed as new is as follows:

1. An aqueous additive for mortar consisting essentially of, on the basis of weight, two parts sodium tripolyphosphate, one part water-soluble ethylene oxide condensation product formed by condensing about 5-15 moles of ethylene oxide with an aliphatic organic compound having an alkyl group containing about 6-18 carbon atoms and selected from the group consisting of fatty acids, amines, and alcohols, and forty parts of sodium dodecylbenzene sulfonate.

2. An aqueous additive as claimed in claim 1 including 57 parts water.

3. An aqueous additive as claimed in claim 2, wherein said ethylene oxide condensation product is iso-octyl phenoxy polyethoxy ethanol.

4. An aqueous additive for mortar consisting essentially of, on the basis of weight, 24 parts sodium dodecylbenzene sulfonate, three parts iso-octyl phenoxy polyethoxy ethanol, two and one-half parts sodium xylene sulfonate, one part ethylenediaminetetraacetic acid and 69 and one-half parts water.

5. A hydrated mortar composition consisting essentially of Portland cement, aggregate, mortar and from about 3 to 12 liquid ounces per 5 gallons of mortar hydrating water of an additive consisting essentially of two parts sodium tripolyphosphate, one part water-soluble organic ethylene oxide condensation product formed by condensing about 5-15 mols of ethylene oxide with an aliphatic organic compound having an alkyl group containing about 6-18 carbon atoms and selected from the group consisting of fatty acids, amines, and alcohols, 40 parts of sodium dodecylbenzene sulfonate and 57 parts water.

* * * * *